US011601384B2

(12) United States Patent
Tillotson et al.

(10) Patent No.: US 11,601,384 B2
(45) Date of Patent: *Mar. 7, 2023

(54) PROCESSING SYSTEM PERFORMING DYNAMIC TRAINING RESPONSE OUTPUT GENERATION CONTROL

(71) Applicant: Allstate Insurance Company, Northbrook, IL (US)

(72) Inventors: Tiffany Tillotson, Algonquin, IL (US); Elizabeth Schreier, Glenview, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,522

(22) Filed: Sep. 10, 2020

(65) Prior Publication Data

US 2020/0412672 A1 Dec. 31, 2020

Related U.S. Application Data

(63) Continuation of application No. 15/992,403, filed on May 30, 2018, now Pat. No. 10,897,434.

(51) Int. Cl.
*H04L 51/02* (2022.01)
*H04L 67/306* (2022.01)
(Continued)

(52) U.S. Cl.
CPC ............ *H04L 51/02* (2013.01); *G06F 40/56* (2020.01); *G06N 20/00* (2019.01); *G06Q 40/08* (2013.01); *H04L 67/306* (2013.01)

(58) Field of Classification Search
CPC ....... H04L 51/02; H04L 67/306; G06N 20/00; G06F 40/56; G06Q 40/08
See application file for complete search history.

(56) References Cited

U.S. PATENT DOCUMENTS 6,510,411 B1 * 1/2003 Norton ................ H04M 3/4936
704/E15.045
6,604,075 B1 8/2003 Brown et al.
(Continued)

OTHER PUBLICATIONS

"Quomation—PowerQuote Comparative Rating for Auto and Home Insurance" http://www.quomation.com/PowerQuote.aspx websited visited Apr. 24, 2018, pp. 1-2.
(Continued)

*Primary Examiner* — Sonia L Gay
(74) *Attorney, Agent, or Firm* — Polsinelli PC

(57) ABSTRACT

Aspects of the disclosure relate to enhanced dynamic training response output generation control systems with enhanced dynamic training response output determinations. A computing platform may receive, from the user device and in response to an initial dynamic training interface, a training request input. The computing platform may send, to an NLU engine, the training request input and commands directing the NLU engine to perform natural language understanding and processing on the training request input to determine a natural language result output. Using the natural language result output, the computing platform may determine third party data sources that correspond to the natural language result output, and may request source data from the third party data sources. Using the source data and the natural language result output, the computing platform may generate a dynamic training response output, and may direct the user device to cause display of the dynamic training response output.

12 Claims, 17 Drawing Sheets

(51) Int. Cl.
*G06Q 40/08* (2012.01)
*G06F 40/56* (2020.01)
*G06N 20/00* (2019.01)

(56) References Cited

U.S. PATENT DOCUMENTS

| | | | |
|---|---|---|---|
| 7,707,505 B1 | 4/2010 | Ohrt et al. | |
| 8,423,392 B2 | 4/2013 | Moxley et al. | |
| 8,433,588 B2 | 4/2013 | Willis et al. | |
| 8,775,514 B2 * | 7/2014 | Goel | G10L 15/00 |
| | | | 379/265.09 |
| 8,799,125 B2 | 8/2014 | Schumann, Jr. | |
| 9,183,593 B2 | 11/2015 | Willis et al. | |
| 9,495,709 B2 | 11/2016 | Borden et al. | |
| 9,916,625 B2 | 3/2018 | Lehman et al. | |
| 10,803,514 B1 * | 10/2020 | Campbell, III | G06Q 40/00 |
| 2009/0070152 A1 | 3/2009 | Sperske et al. | |
| 2010/0100398 A1 | 4/2010 | Auker et al. | |
| 2011/0216897 A1 * | 9/2011 | Laredo | H04M 3/00 |
| | | | 379/265.13 |
| 2011/0238755 A1 | 9/2011 | Khan et al. | |
| 2013/0073388 A1 | 3/2013 | Heath | |
| 2013/0325517 A1 | 12/2013 | Berg | |
| 2015/0161538 A1 | 6/2015 | Matus et al. | |
| 2015/0178849 A1 | 6/2015 | Berger et al. | |
| 2015/0189085 A1 | 7/2015 | Riahi et al. | |
| 2016/0063382 A1 * | 3/2016 | Allen | G06N 5/04 |
| | | | 706/11 |
| 2016/0098800 A1 | 4/2016 | Atwell et al. | |
| 2016/0350723 A1 * | 12/2016 | Spriggs | G06F 16/29 |
| 2017/0103070 A1 | 4/2017 | He | |
| 2017/0324867 A1 * | 11/2017 | Tamblyn | H04L 65/1093 |
| 2018/0114127 A1 * | 4/2018 | Cole | G06N 5/04 |
| 2018/0137419 A1 | 5/2018 | Byron et al. | |
| 2018/0261203 A1 * | 9/2018 | Zoller | G10L 13/00 |
| 2018/0276218 A1 * | 9/2018 | Pidaparthi | G06F 21/552 |
| 2018/0336640 A1 | 11/2018 | Dziabiak et al. | |

OTHER PUBLICATIONS

"Apttus CPQ (Configure Price Quote)" https://appexchange.salesforce.com/appxListingDetail?istingId=a0N300000016bGHEAY website visited May 9, 2018, 1 page.

"Conversational AI Platform for Insurance | ProNavigator" https://pronavigator.ai/conversational-ai-platform/ website visited Apr. 24, 2018, pp. 1-3.

Jan. 13, 2020—U.S. Non-Final Office Action—U.S. Appl. No. 15/992,403.

Jun. 16, 2020—U.S. Notice of Allowance—U.S. Appl. No. 15/992,403.

Jun. 23, 2020—(CA) Office Action—App. No. 3044631.

Oct. 30, 2020—U.S. Notice of Allowance—U.S. Appl. No. 15/992,403.

* cited by examiner

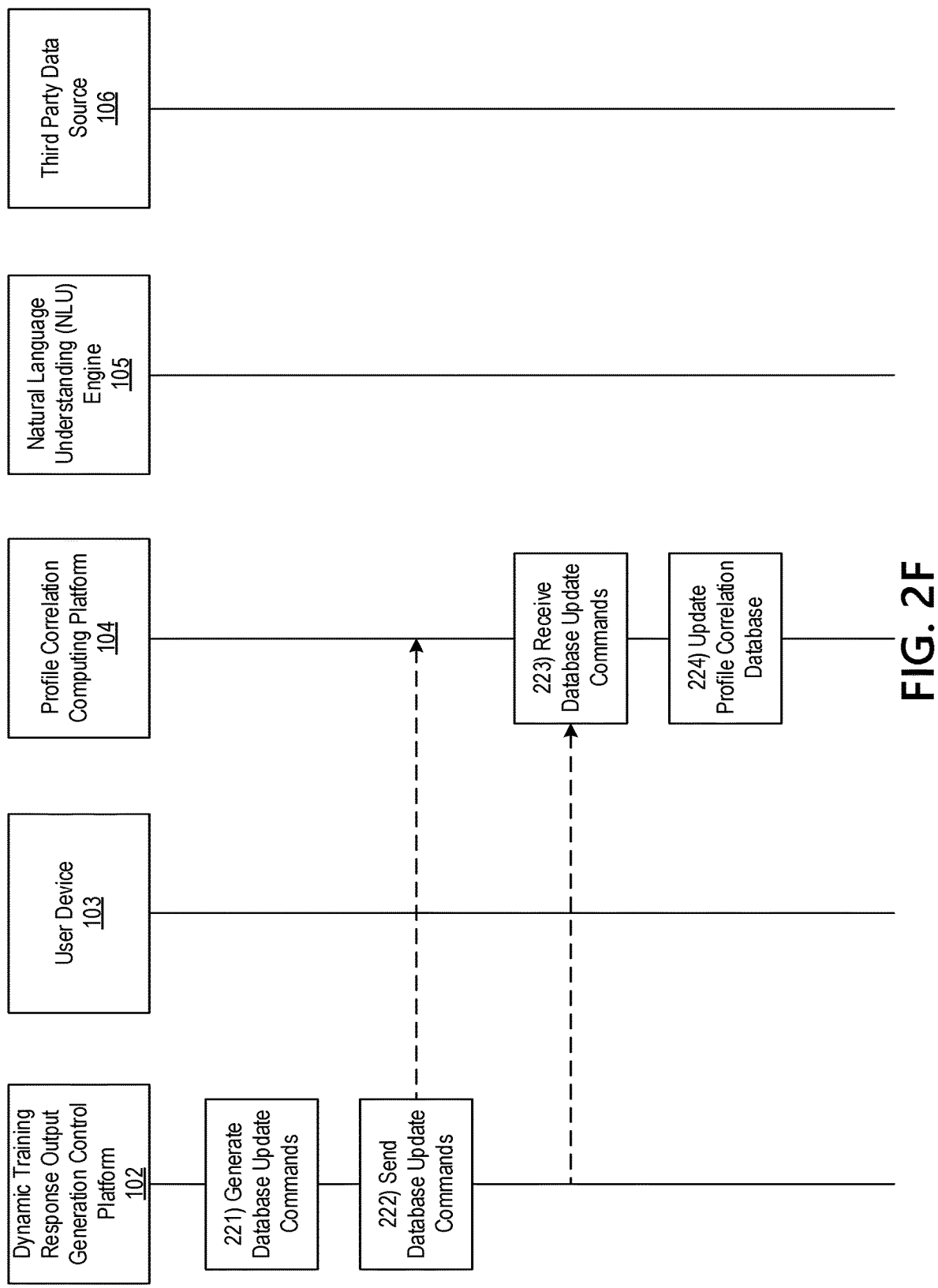

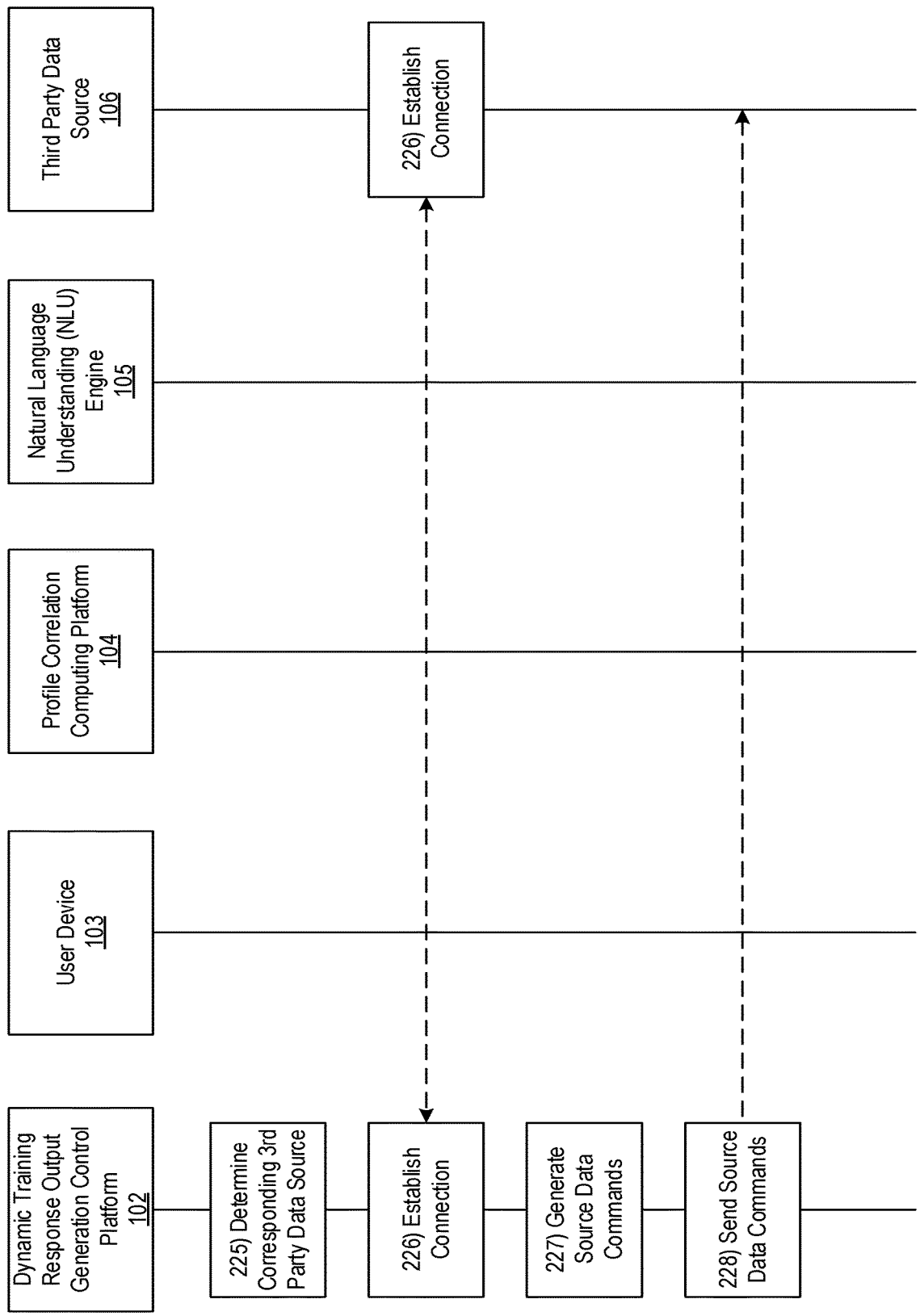

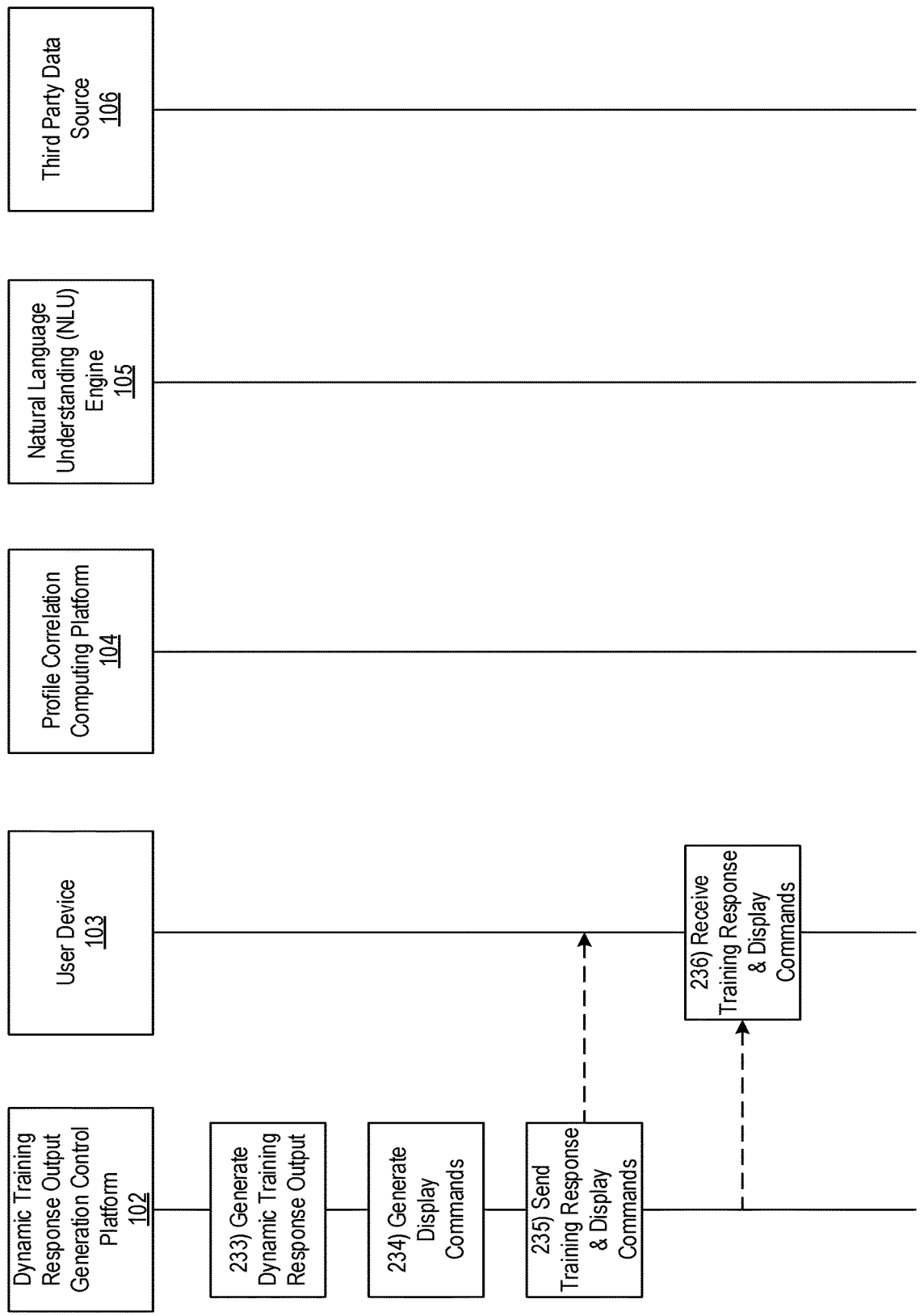

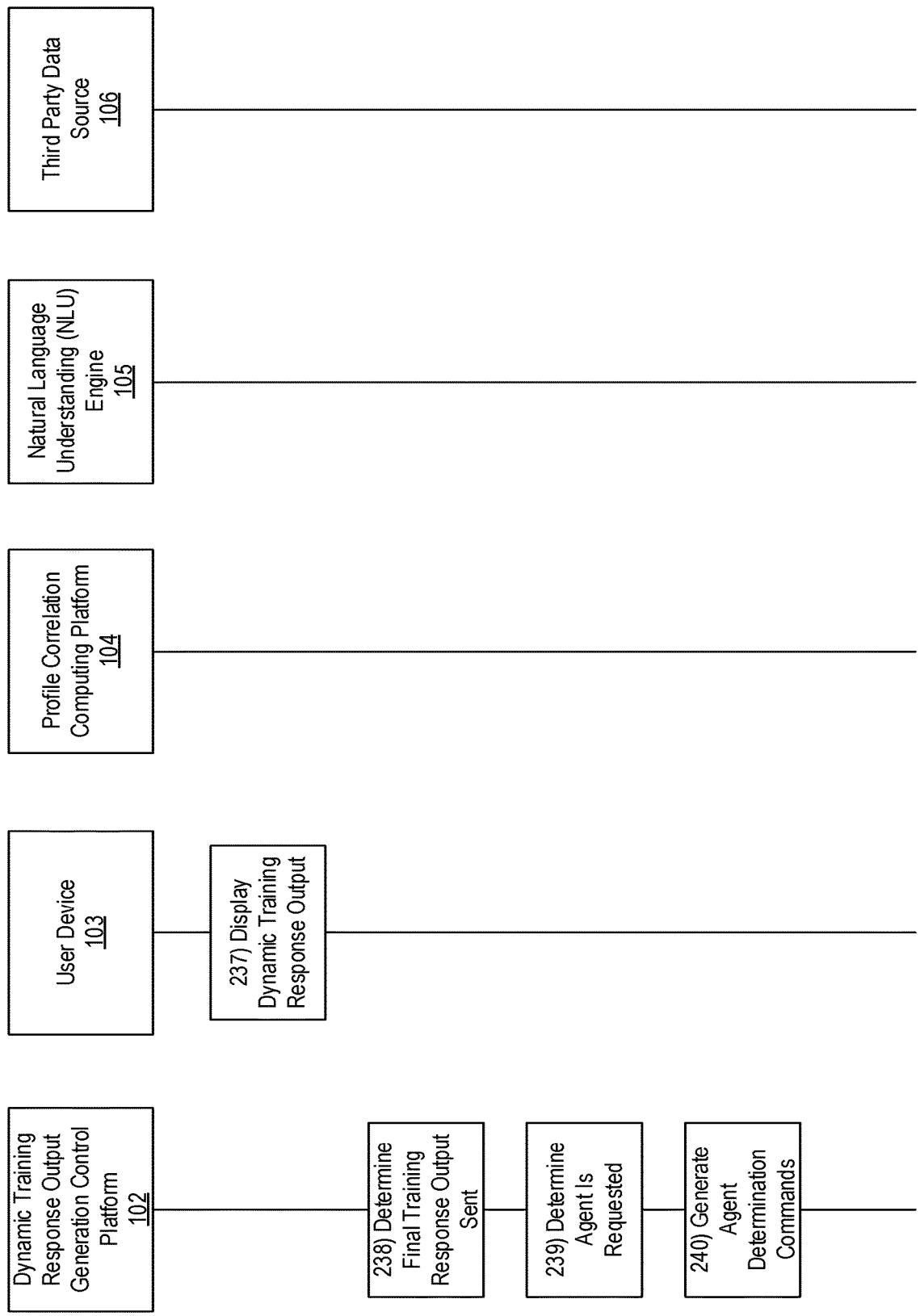

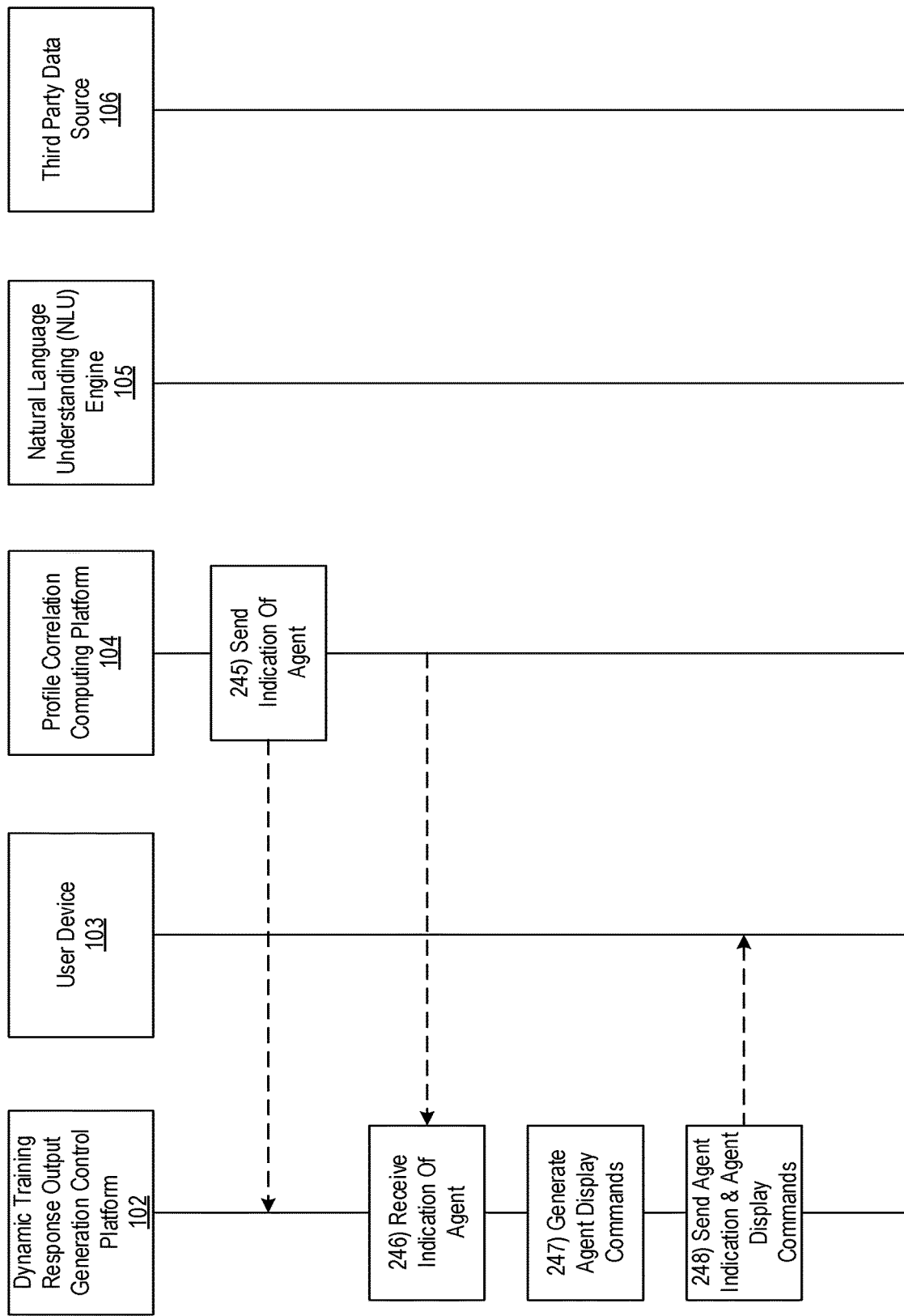

305

Guided Experience Interface

What do you want to learn about first?

- Auto
- Home

Conversational Experience Interface

What do you want to learn about first?

I'm a driver for a rideshare service. Am I covered?

FIG. 4

PROCESSING SYSTEM PERFORMING DYNAMIC TRAINING RESPONSE OUTPUT GENERATION CONTROL

CROSS-REFERENCE TO RELATED APPLICATIONS

The present application is a continuation of U.S. Ser. No. 15/992,403 filed on May 30, 2018, and entitled "Processing System Performing Dynamic Training Response Output Generation Control," which is hereby incorporated by reference as to its entirety.

BACKGROUND

Aspects of the disclosure relate to enhanced processing systems for providing a dynamic training response output with improved dynamic training response output determination capabilities. In particular, one or more aspects of the disclosure relate to dynamic training response output generation control platforms that utilize natural language processing and understanding to facilitate dynamic training interactions.

Because many organizations and individuals rely on portals as a method for receiving information related to products and concepts, improving the quality of such portals for their managing organizations is important. In many instances, however, it may be difficult to effectively generate dynamic training response outputs tailored to a user.

SUMMARY

Aspects of the disclosure provide effective, efficient, scalable, and convenient technical solutions that address and overcome the technical problems associated with optimizing the performance of dynamic training response output generation control platforms, along with the information that such systems may provide in response to training input requests, using dynamic training response output generation techniques.

In accordance with one or more arrangements discussed herein, a computing platform having at least one processor, a communication interface, and memory may receive, from a user device, a request for a dynamic training interface. The computing platform may generate, in response to receiving the request for the dynamic training interface, initial dynamic training interface information. The computing platform may generate one or more commands directing the user device to generate an initial dynamic training interface using the initial dynamic training interface information. The computing platform may send, via the communication interface, the initial dynamic training interface information and the one or more commands directing the user device to generate the initial dynamic training interface using the initial dynamic training interface information. The computing platform may receive, from the user device and in response to the initial dynamic training interface, a training request input. The computing platform may generate one or more commands directing a natural language understanding (NLU) engine to perform natural language understanding and processing on the training request input to determine a natural language result output. The computing platform may send, to the NLU engine, the training request input and the one or more commands directing the NLU engine to perform natural language understanding and processing on the training request input to determine the natural language result output. The computing platform may receive, from the NLU engine, the natural language result output. The computing platform may determine one or more third party data sources that correspond to the natural language result output. The computing platform may generate one or more commands directing the one or more third party data sources to send source data corresponding to the natural language result output. The computing platform may send, to the one or more third party data sources, the one or more commands directing the one or more third party data sources to send source data corresponding to the natural language result output. The computing platform may receive, from the one or more third party data sources, the source data corresponding to the natural language result output. The computing platform may generate a dynamic training response output based on the natural language result output and the source data. The computing platform may generate one or more commands directing the user device to cause display of the dynamic training response output. The computing platform may send, to the user device, the dynamic training response output and the one or more commands directing the user device to cause display of the dynamic training response output.

In some arrangements, the computing platform may establish a wireless data connection with a profile correlation computing platform. The computing platform may generate one or more commands directing the profile correlation computing platform to update based on the natural language result output. The computing platform may send, using the wireless data connection with the profile correlation computing platform, the one or more commands directing the profile correlation computing platform to update based on the natural language result output.

In some examples, the computing platform may determine that a final dynamic training response output has been sent. The computing platform may determine, after determining that the final dynamic training response output has been sent, that an agent is requested. The computing platform may generate one or more commands to identify an agent corresponding to a user of the user device. The computing platform may send, to the profile correlation computing platform, the one or more commands to identify the agent corresponding to the user, wherein sending the one or more commands causes the profile correlation computing platform to determine the agent using one or more machine learning algorithms and one or more machine learning datasets.

In some arrangements, the computing platform may determine that the final dynamic training response output has been sent based on an indication from the user.

In some examples, the computing platform may receive an indication of the agent from the profile correlation computing platform. The computing platform may generate one or more commands directing the user device to cause display of the indication of the agent.

In some arrangements, the computing platform may determine, based on previously received training request inputs, that granularity of the dynamic training response output should be increased. The computing platform may determine, after determining that granularity of the dynamic training response output should be increased, a more specific dynamic training response output in comparison to previously send dynamic training response outputs.

In some examples, the initial dynamic training interface may prompt the user to select either a guided dynamic training experience or an unguided dynamic training experience, wherein the guided dynamic training experience prompts the user to make selections and the unguided dynamic training experience prompts the user for questions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2M depict an illustrative event sequence for deploying a dynamic training response output generation control platform that utilizes improved dynamic training response output generation techniques in accordance with one or more example arrangements discussed herein;

FIGS. 3-4 depict example graphical user interfaces for a dynamic training response output generation control platform that utilizes improved dynamic training response output generation techniques in accordance with one or more example arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

It may be difficult for individuals to become educated with regard to multiple types of products that are tailored to their lifestyle without shopping for a quote. A processing system capable of determining user characteristics through natural language understanding and processing, and determining corresponding dynamic training response outputs, may reduce an amount of time a customer may spend trying to become educated about various products. Furthermore, a processing system that may adjust a granularity of responses to a customer may be advantageous. It may take a customer many questions to reach a satisfactory education threshold. A system that can determine a customer's level of interest corresponding to various products, and tailor dynamic training response outputs based on the level of interest may be advantageous, as it may reduce the amount of time for customers to reach the satisfactory education threshold.

Figure 1A:
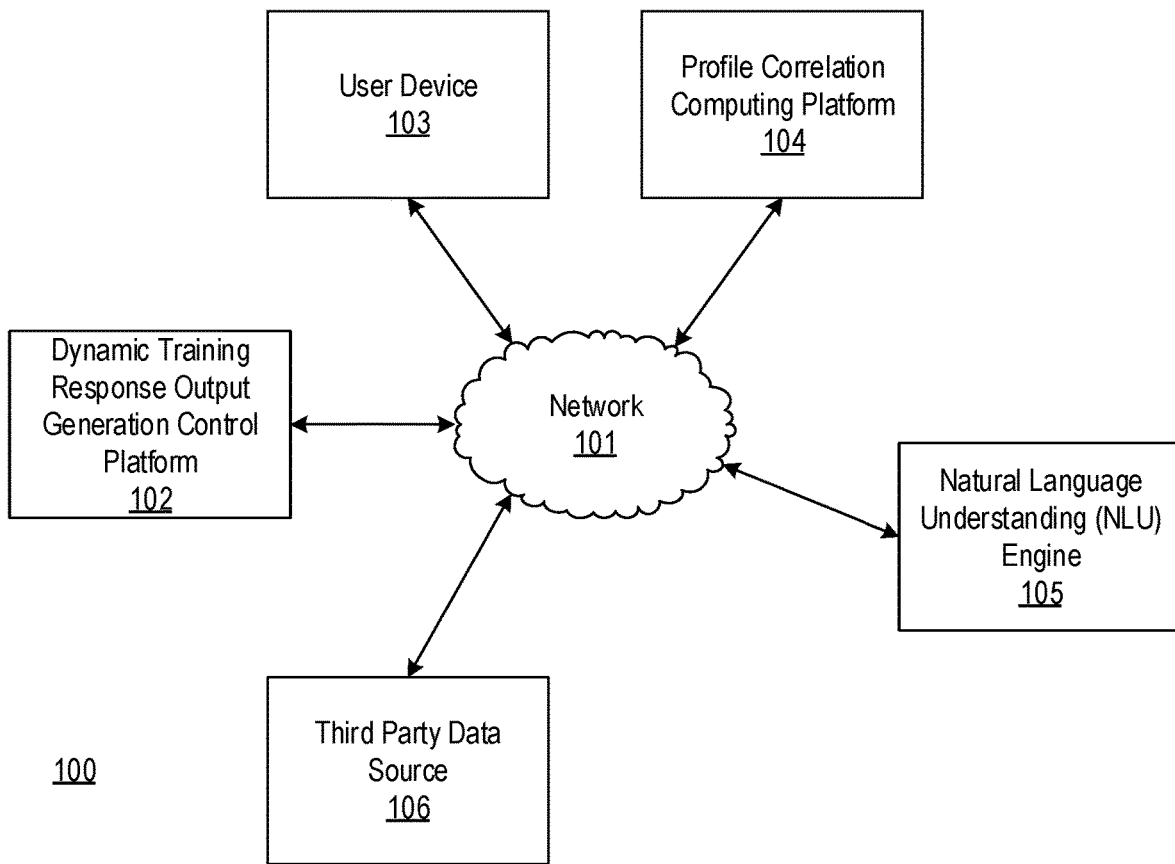
FIGS. 1A-1B depict an illustrative computing environment for deploying a dynamic training response output generation control platform that utilizes improved dynamic training response output generation techniques in accordance with one or more example arrangements discussed herein.
Figure 1B:
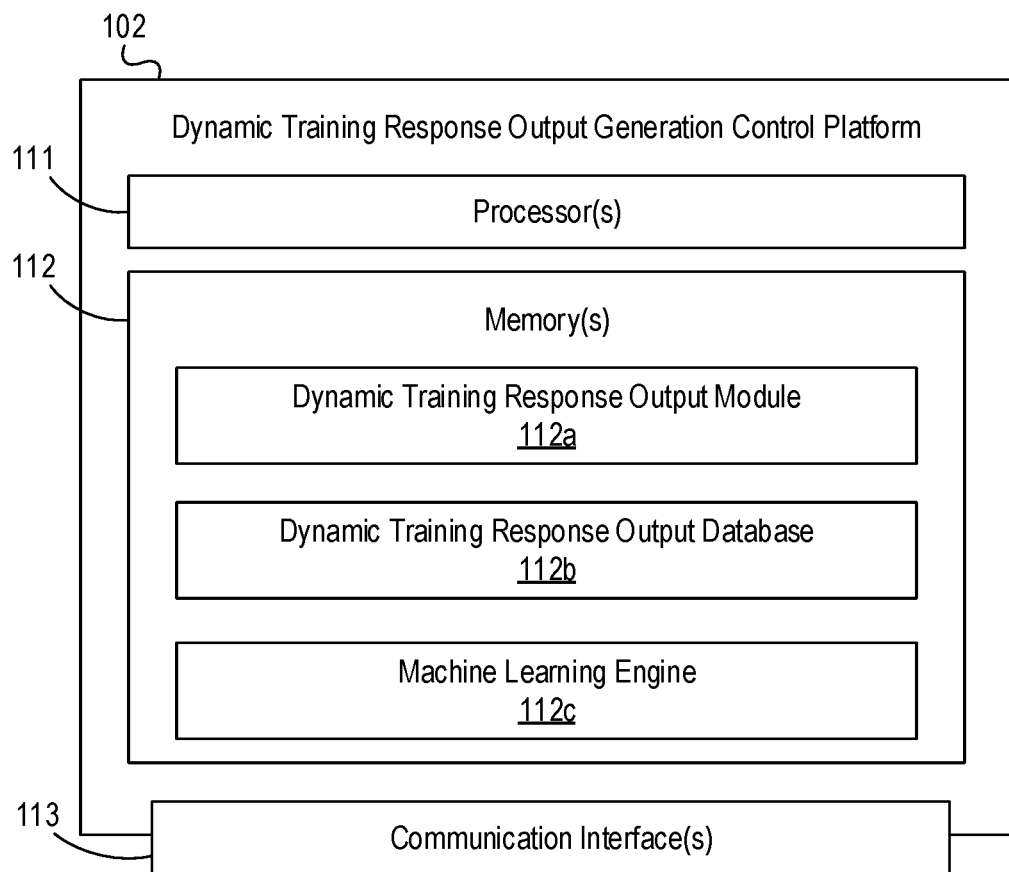

FIGS. 1A-1B depict an illustrative computing environment for deploying a dynamic training response output generation control platform that utilizes improved dynamic training response output generation techniques in accordance with one or more example embodiments. Referring to FIG. 1A, computing environment 100 may include one or more computer systems. For example, computing environment 100 may include a dynamic training response output generation control platform 102, a user device 103, a profile correlation computing platform 104, a natural language understanding (NLU) engine 105, and a third party data source 106.

As illustrated in greater detail below, dynamic training response output generation control platform 102 may include one or more computing devices configured to perform one or more of the functions described herein. For example, dynamic training response output generation control platform 102 may include one or more computers (e.g., laptop computers, desktop computers, servers, server blades, or the like) configured to receive requests for dynamic training interfaces and training input requests, generate requests for third party source data outputs and natural language result outputs, and generate dynamic training response outputs.

In addition, and as illustrated in greater detail below, the dynamic training response output generation control platform 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by dynamic training response output generation control platform 102 may be associated with an external portal provided by an organization, such as a dynamic training portal provided by an insurance institution.

User device 103 may be a smartphone, personal digital assistant, voice recognition assistant, laptop computer, tablet computer, desktop computer, or the like. Although computing environment 100 as shown includes a single user device 103, it should be understood that the computing environment 100 may include any number of user devices similar to user device 103.

In addition, and as illustrated in greater detail below, user device 103 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 103 may be associated with an external portal provided by an organization.

Profile correlation computing platform 104 may be a computing platform associated with an organization that controls the dynamic training response outputs. For example, the profile correlation computing platform 104 may be maintained by the organization, and may be used to store characteristics corresponding to various customers and employees, as well as correlations between customers and employees. The profile correlation computing platform 104 may comprise, for example, a server, a server blade, or the like.

Natural language understanding (NLU) engine 105 may be a computing platform capable of performing natural language processing, natural language understanding, or both. The NLU engine 105 may receive training request inputs from the dynamic training response output generation control platform, and may determine context and intent of the training request inputs to generate a natural language result output. The NLU engine 105 may send the natural language result output to the dynamic training response output generation control platform 102.

Third party data source 106 may comprise one or more computing devices and/or other computer components (e.g., processors, memories, communication interfaces). The third party data source 106 may comprise a database of third party source data, such as housing records, vehicle records, manufacturer records, historical source data, and the like. The third party data source 106 may receive requests, from the dynamic training response output generation control platform 102, for third party source data related to training request inputs provided using dynamic training interfaces on the user device 103.

Computing environment 100 also may include one or more networks, which may interconnect one or more of dynamic training response output generation control platform 102, user device 103, profile correlation computing platform 104, NLU engine 105, and third party data source 106. For example, computing environment 100 may include a network 101 (which may, e.g., interconnect dynamic training response output generation control platform 102, user device 103, profile correlation computing platform 104, NLU engine 105, and third party data source 106).

In one or more arrangements, dynamic training response output generation control platform 102, user device 103, profile correlation computing platform 104, NLU engine 105, and third party data source 106, and/or the other systems included in computing environment 100 may be any type of computing device capable of receiving a user interface, receiving input using the user interface, and communicating the received input to one or more other computing devices. For example, dynamic training response output generation control platform 102, user device 103, profile correlation computing platform 104, NLU engine 105, and third party data source 106, and/or the other systems included in computing environment 100 may, in some instances, be and/or include server computers, voice recognition digital assistants, desktop computers, laptop computers, tablet computers, smart phones, or the like that may include one or more processors, memories, communication interfaces, storage devices, and/or other components. As noted above, and as illustrated in greater detail below, any and/or all of dynamic training response output generation control platform 102, user device 103, profile correlation computing platform 104, NLU engine 105, and third party data source 106 may, in some instances, be special-purpose computing devices configured to perform specific functions.

Referring to FIG. 1B, dynamic training response output generation control platform 102 may include one or more processors 111, memory 112, and communication interface 113. A data bus may interconnect processor 111, memory 112, and communication interface 113. Communication interface 113 may be a network interface configured to support communication between dynamic training response output generation control platform 102 and one or more networks (e.g., network 101, or the like). Memory 112 may include one or more program modules having instructions that when executed by processor 111 cause dynamic training response output generation control platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic training response output generation control platform 102 and/or by different computing devices that may form and/or otherwise make up dynamic training response output generation control platform 102. For example, memory 112 may have, store, and/or include a dynamic training response output module 112a, a dynamic training response output database 112b, and a machine learning engine 112c. Dynamic training response output module 112a may have instructions that direct and/or cause dynamic training response output generation control platform 102 to execute advanced techniques for processing requests for dynamic training interfaces, as discussed in greater detail below. Dynamic training response output database 112b may store information used by dynamic training response output module 112a and/or dynamic training response output generation control platform 102 in dynamic training response output generation control and/or in performing other functions. Machine learning engine 112c may have instructions that direct and/or cause the dynamic training response output generation control platform 102 to perform dynamic training response output generation control and to set, define, and/or iteratively refine optimization rules and/or other parameters used by the dynamic training response output generation control platform 102 and/or other systems in computing environment 100.

Figure 2A:
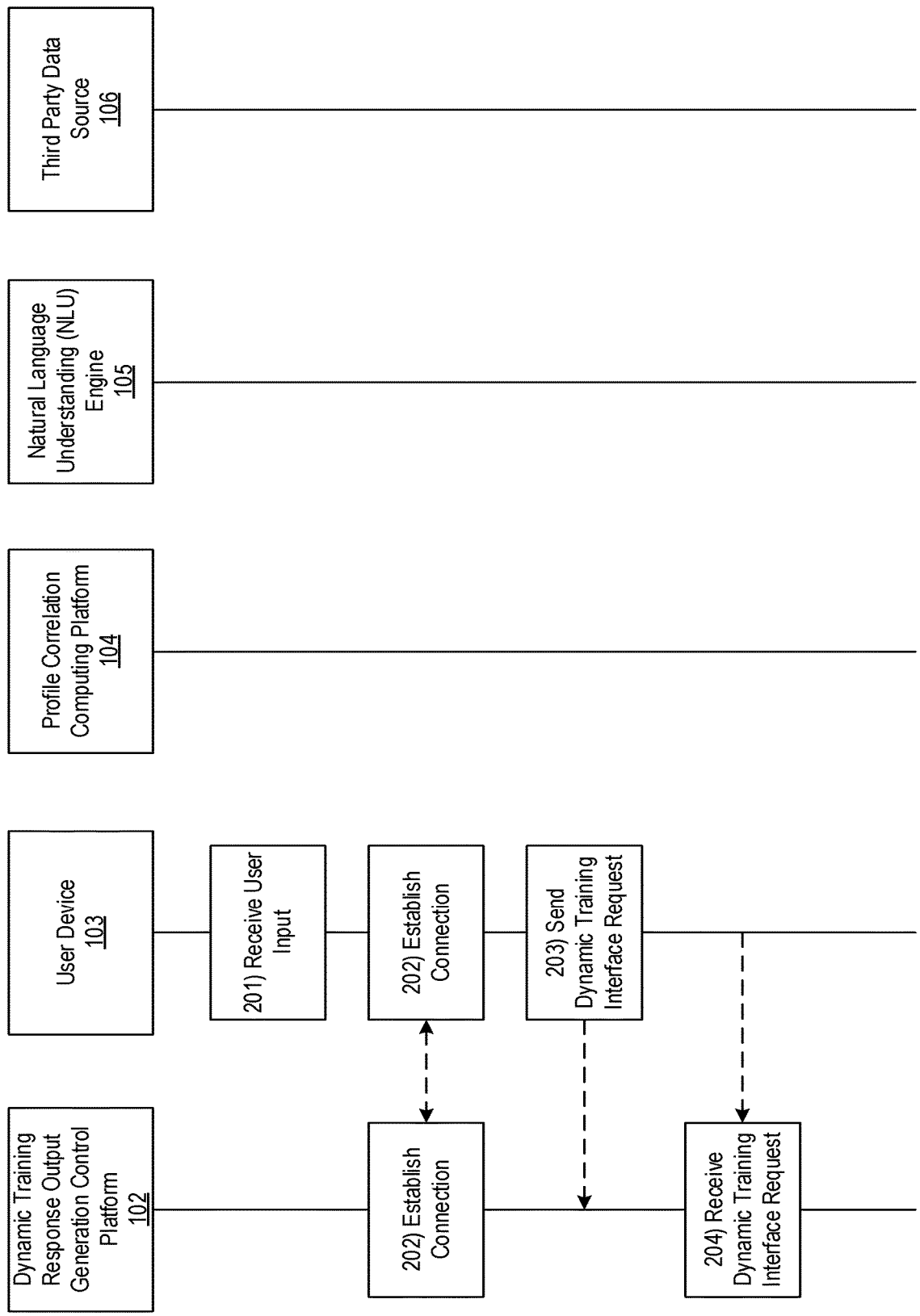

FIGS. 2A-2M depict an illustrative event sequence for deploying a dynamic training response output generation control platform 102 that utilizes improved dynamic training response output generation techniques in accordance with one or more example embodiments. Referring to FIG. 2A, at step 201, the user device 103 may receive user input. For example, the user device 103 may receive, via a user interface displayed on a display of the user device 103, a user input requesting access to a dynamic training interface. The dynamic training interface may be one or more user interfaces that allow a user to ask questions related to different products, such as one or more insurance products. In some examples, the user may not need to be shopping for a quote to ask questions.

At step 202, the user device 103 may establish a connection with the dynamic training response output generation control platform 102. For example, the user device 103 may establish a first wireless data connection to the dynamic training response output generation control platform 102 to link the user device 103 to the dynamic training response output generation control platform 102.

At step 203, the user device 103 may send the dynamic training interface request to the dynamic training response output generation control platform 102. For example, the user device 103 may send, while the first wireless data connection is established and to the dynamic training response output generation control platform 102, the dynamic training interface request.

At step 204, the dynamic training response output generation control platform 102 may receive the dynamic training interface request. For example, the dynamic training response output generation control platform 102 may receive, while the first wireless data connection is established, via the communication interface 113, and from the user device 103, the dynamic training interface request.

Figure 2B:
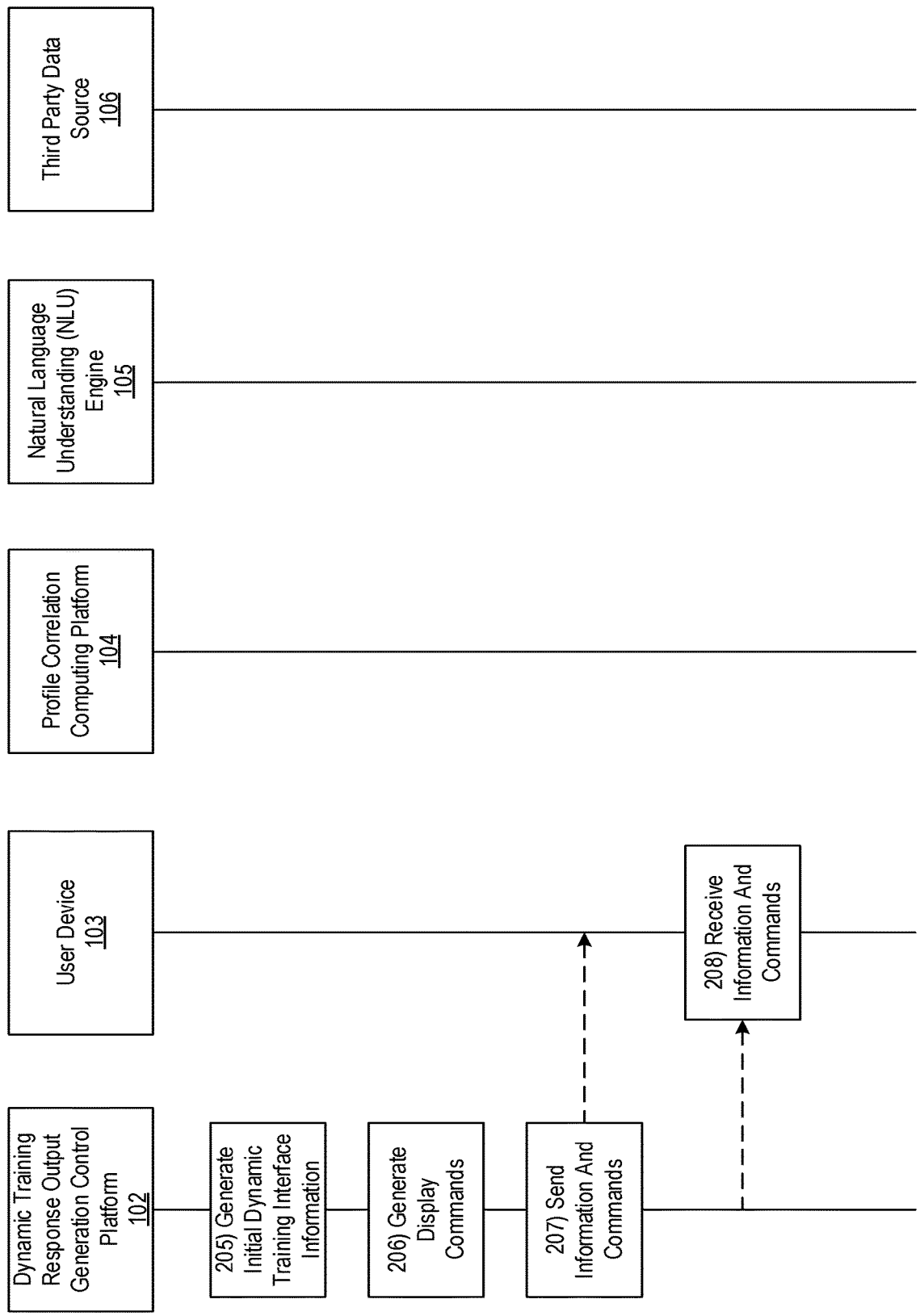

Referring to FIG. 2B, at step 205, the dynamic training response output generation control platform 102 may generate initial dynamic training interface information. For example, in generating the initial dynamic training interface information, the dynamic training response output generation control platform may generate information that may be used by the user device 103 to generate an initial dynamic training interface.

At step 206, the dynamic training response output generation control platform 102 may generate one or more commands directing the user device to cause display of the initial dynamic training interface.

At step 207, the dynamic training response output generation control platform 102 may send the initial dynamic training interface information generated at step 205 and the one or more commands directing the user device to cause display of the initial dynamic training interface generated at step 206 to the user device. For example, the dynamic training response output generation control platform 102 may send, while the first wireless data connection is established, via the communication interface 113, and to the user device, the initial dynamic training interface information and the one or more commands directing the user device to cause display of the initial dynamic training interface. In sending the initial dynamic training interface information and the one or more commands directing the user device to cause display of the initial dynamic training interface, the dynamic training response output generation control platform 102 may not engage the user device (and subsequently the user) in a quote shopping experience. Rather, the dynamic training response output generation control platform 102 may cause an educational tool to initiate that may teach the user about various products and answer questions.

At step 208, the user device 103 may receive the initial dynamic training interface information and the one or more commands directing the user device to cause display of the initial dynamic training interface sent at step 207. For example, the user device 103 may receive, while the first wireless data connection is established and from the dynamic training response output generation control platform 102, the initial dynamic training interface information and the one or more commands directing the user device 103 to cause display of the initial dynamic training interface.

Figure 2C:
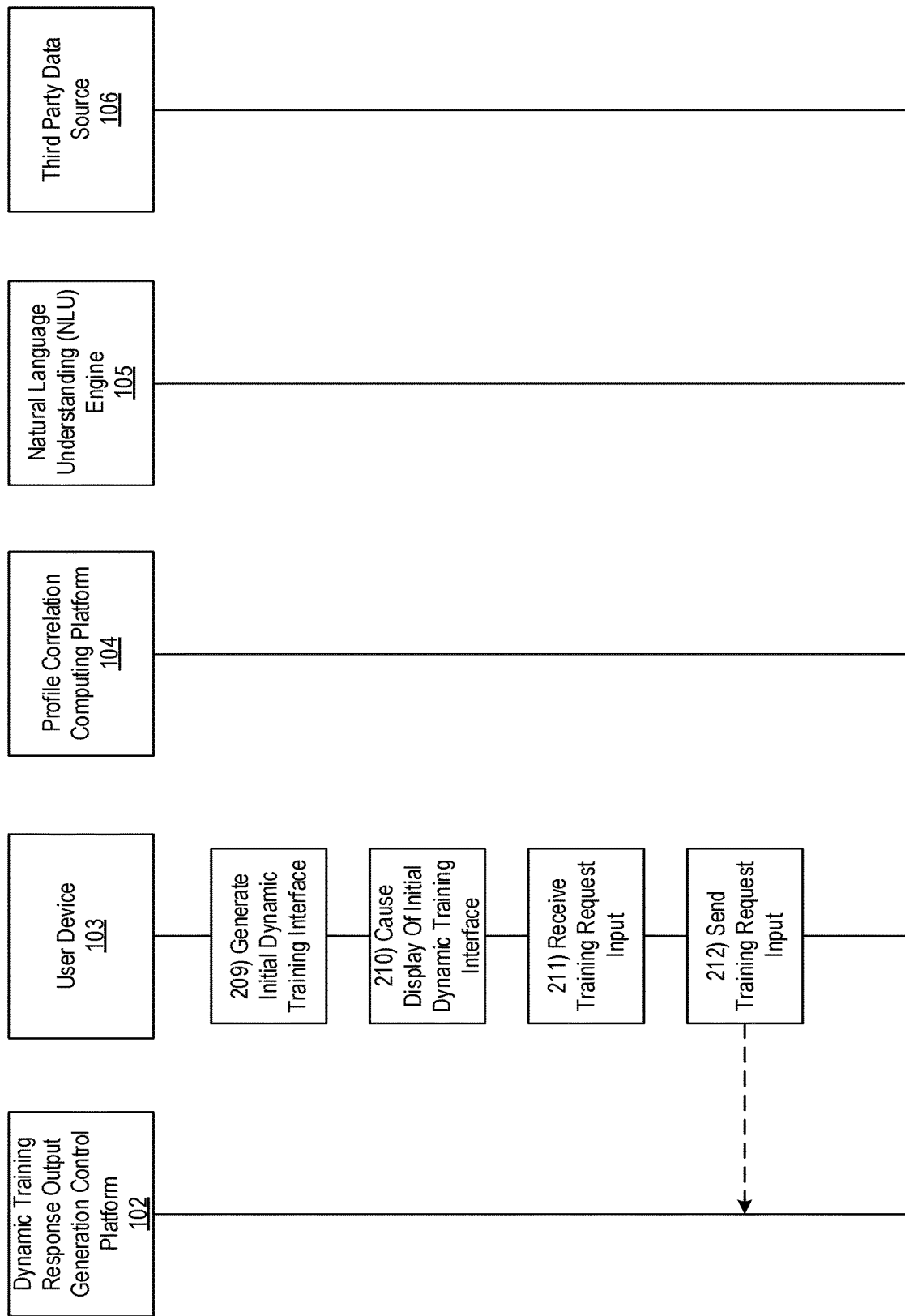

Referring to FIG. 2C, at step 209, the user device 103 may generate the initial dynamic training interface. For example, the user device 103 may generate the initial dynamic training interface based on the initial dynamic training interface information and in response to the one or more commands directing the user device 103 to cause display of the initial dynamic training interface. In some examples, in generating the initial dynamic training interface, the user device 103 may generate a user interface prompting a user to select one of a guided experience interface and a conversational experience interface. For example, the initial dynamic training interface may include language such as "Would you like to engage in a guided training experience or a conversational training experience?" In some examples, rather than causing display of the initial dynamic training interface, the user device 103 may generate an audio output, such as "Would you like to engage in a guided training experience or a conversational training experience?" If the user device 103 receives an input corresponding to the guided training experience, the user device 103 may display and/or otherwise present a graphical user interface similar to graphical user interface 305, which is illustrated in FIG. 3. The guided experience interface may include one or more methods for selection (e.g., drop down menus, buttons, selection tools, and the like), and may receive user input through these one or methods for selection. For example, a user may click a button corresponding to auto if they want to learn more about auto products or the user may click a button corresponding to home if they want to learn more about home products. In some examples, the user may make a selection using an audio input.

If the user device 103 receives an input corresponding to the conversational experience interface, the user device 103 may display and/or otherwise present a graphical user interface similar to graphical user interface 405, which is illustrated in FIG. 4. The conversational experience may include a text box in which a user may enter a textual question. For example, the user interface may ask "What do you want to learn about first?," and the user may indicate that he or she is a driver for a ridesharing service and may ask whether they are covered. In some examples, the user may ask a question, and voice recognition and natural language processing may be used to determine the context and intent of the question.

At step 210, the user device 103 may cause display of the initial dynamic training interface, generated at step 209 above. In some examples, rather than causing display of the initial dynamic training interface, the user device 103 may cause audio corresponding to the initial dynamic training interface to be output. In some examples, the user device may cause display of the initial dynamic training interface and cause output of audio corresponding to the initial dynamic training interface. In some examples, the initial dynamic training interface may prompt the user for additional information, such an address and the like.

At step 211, the user device 103 may receive a training request input. For example, the user device 103 may receive a user input corresponding to a selection or a question on the initial dynamic training interface. The training request input may be a request for information corresponding to a particular concept or product, such as an insurance concept or product. In some examples, the training request input may be a selection, such as selection of a "Yes" or "No" button. In other examples, the training request input may be a textual or audio input. For example, the user may ask "I am a ride share driver, am I covered?" In some examples, the training request input may indicate "What if I hit a deer?" In some examples, the user may ask for more information regarding comprehensive coverage.

At step 212, the user device 103 may send the training request input to the dynamic training response output generation control platform 102. For example, the user device 103 may send, while the first wireless data connection is established and to the dynamic training response output generation control platform 102, the training request input.

Figure 2D:
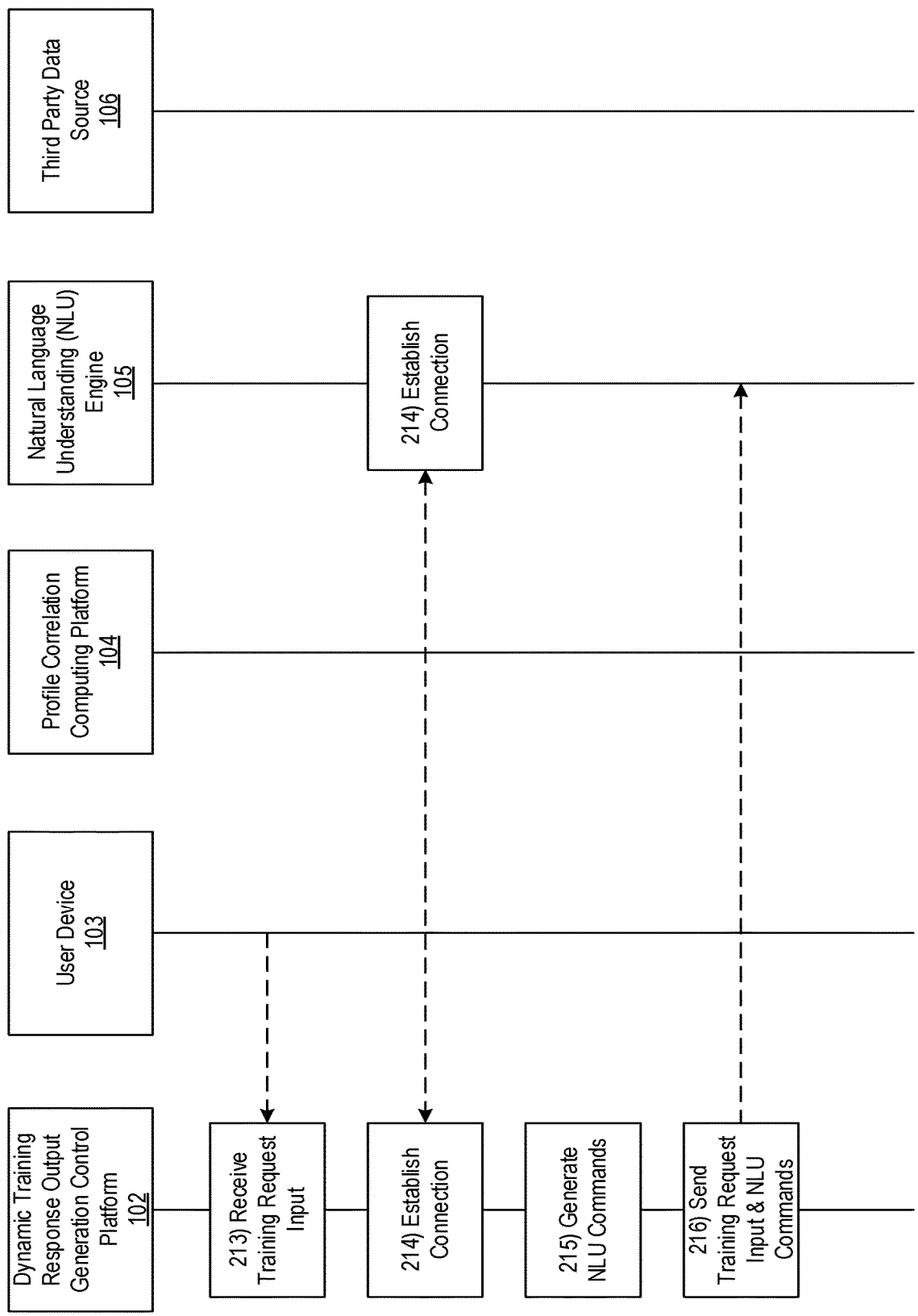

Referring to FIG. 2D, at step 213, the dynamic training response output generation control platform 102 may receive the training request input sent at step 212. For example, the dynamic training response output generation control platform 102 may receive, while the first wireless data connection is established, via the communication interface 113, and from the user device 103, the training request input.

At step 214, the dynamic training response output generation control platform 102 may establish a connection with the NLU engine 105. For example, the dynamic training response output generation control platform 102 may establish a second wireless data connection with the NLU engine 105 to link the dynamic training response output generation control platform 102 to the NLU engine 105.

At step 215, the dynamic training response output generation control platform 102 may generate one or more commands directing the NLU engine 105 to perform natural language understanding and processing on the training request input to determine a natural language result output.

At step 216, the dynamic training response output generation control platform 102 may send the training request input received at step 213 and the one or more commands directing the NLU engine 105 to perform natural language understanding and processing on the training request input to determine a natural language result output generated at step 215 to the NLU engine 105. For example, the dynamic training response output generation control platform 102 may send, while the second wireless data connection is established, via the communication interface 113, and to the NLU engine 105, the training request input and the one or more commands directing the NLU engine 105 to perform natural language understanding and processing on the training request input to determine a natural language result output.

Figure 2E:
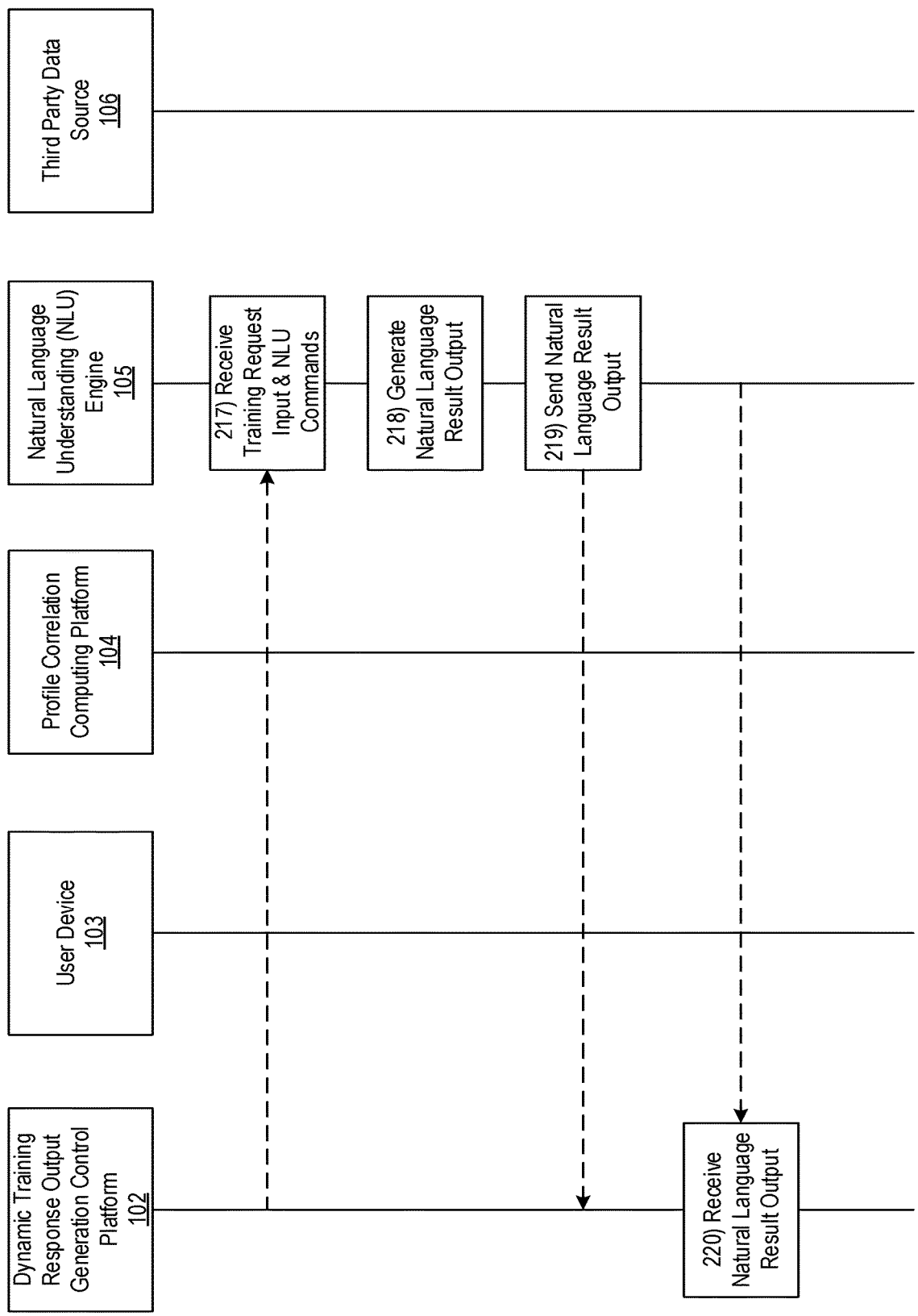

Referring to FIG. 2E, at step 217, the NLU engine 105 may receive, while the second wireless data connection is established and from the dynamic training response output generation control platform 102, the training request input and one or more commands directing the NLU engine 105 to perform natural language understanding and processing on the training request input to determine a natural language result output. For example, the NLU engine 105 may receive the training request input and the one or more commands directing the NLU engine 105 to perform natural language understanding and processing on the training request input to determine a natural language result output.

At step 218, the NLU engine 105 may generate the natural language result output. For example, using one or more machine learning algorithms and one or more machine learning datasets, the NLU engine 105 may determine an intent and a context corresponding to the training request input. In some examples, the training request input may be a textual input. In these examples, the NLU engine 105 may generate the natural language result output based on the textual input. In other examples, the training request input may be an audio input. In these examples, the NLU engine 105 may generate the natural language result output based on the audio input.

At step 219, the NLU engine 105 may send the natural language result output, generated at step 218, to the dynamic training response output generation control platform 102. For example, the NLU engine 105 may send, while the second wireless data connection is established and to the dynamic training response output, the natural language result output. The natural language result output may include at least one of a context and an intent corresponding to the training request input.

At step 220, the dynamic training response output generation control platform 102 may receive the natural language result output sent at step 219. For example, the dynamic training response output generation control platform 102 may receive, while the second wireless data connection is established, the natural language result output.

Referring to FIG. 2F, at step 221, after receiving the natural language result output, the dynamic training response output generation control platform 102 may generate one or more commands directing profile correlation computing platform 104 to update based on the natural language result output.

At step 222, the dynamic training response output generation control platform 102 may send the one or more commands directing the profile correlation computing platform 104 to update based on the natural language result output. For example, the dynamic training response output generation control platform 102 may establish a third wireless data connection with the profile correlation computing platform 104 to link the dynamic training response output generation control platform 102 to the profile correlation computing platform 104. The dynamic training response output generation control platform may send, while the third wireless data connection is established and to the profile correlation computing platform 104, the one or more commands directing the profile correlation computing platform 104 to update based on the natural language result output.

At step 223, the profile correlation computing platform 104 may receive the one or more commands directing the profile correlation computing platform 104 to update based on the natural language result output. For example, the profile correlation computing platform 104 may receive, while the third wireless data connection is established, the one or more commands directing the profile correlation computing platform 104 to update based on the natural language result output.

At step 224, the profile correlation computing platform 104 may cause itself to update in response to the one or more commands directing the profile correlation computing platform 104 to update based on the natural language result output. The profile correlation computing platform 104 may maintain a database of user profiles corresponding to various customers. The user profiles may indicate information that a user has previously requested (e.g., homeowners insurance, auto insurance, renter insurance, boat insurance, life insurance, and the like). The profile correlation computing platform 104 may also maintain a database of agent profiles corresponding to various agents. The agent profiles may indicate products and/or services with which each agent is involved. The profile correlation computing platform 104 may use one or more machine learning algorithms and one or more machine learning datasets to determine correlations between the agent profiles and the user profiles, thus determining agents that may be of assistance to the user based on questions that the user has been asking. The profile correlation computing platform 104 may continuously update as new information is received. For example, the natural language result output may indicate that the user is requesting information corresponding to auto insurance, whereas the user's profile in the profile correlation computing platform 104 may indicate that the user previously requested information corresponding to homeowners insurance. Based on this information, the profile correlation computing platform 104 may update the user profile to add an interest in auto insurance and to add a correlation between the user and one or more auto insurance agents.

Referring to FIG. 2G, at step 225, the dynamic training response output generation control platform 102 may determine a third party data source corresponding to the natural language result output. For example, if the natural language result output corresponds to auto insurance, the dynamic training response output generation control platform 102 may determine a local department of motor vehicles.

At step 226, the dynamic training response output generation control platform 102 may establish a connection with the third party data source determined at step 225. For example, the dynamic training response output generation control platform 102 may establish a fourth wireless data connection to link the dynamic training response output generation control platform 102 to the third party data source 106.

At step 227, the dynamic training response output generation control platform 102 may generate one or more commands directing the third party data source 106 to provide third party source data corresponding to the natural language result output.

At step 228, the dynamic training response output generation control platform 102 may send, to the third party data source, the one or more commands directing the third party data source 106 to provide third party source data corresponding to the natural language result output. For example, the dynamic training response output generation control platform 102 may send, while the fourth wireless data connection is established, to the third party data source, and via the communication interface 113, the one or more commands directing the third party data source 106 to provide third party source data corresponding to the natural language result output. In some examples, the dynamic training response output generation control platform 102 may send the one or more commands directing the third party data source 106 to provide third party source data corresponding to the natural language result output along with geolocation data identifying a location corresponding to the user device.

Figure 2H:
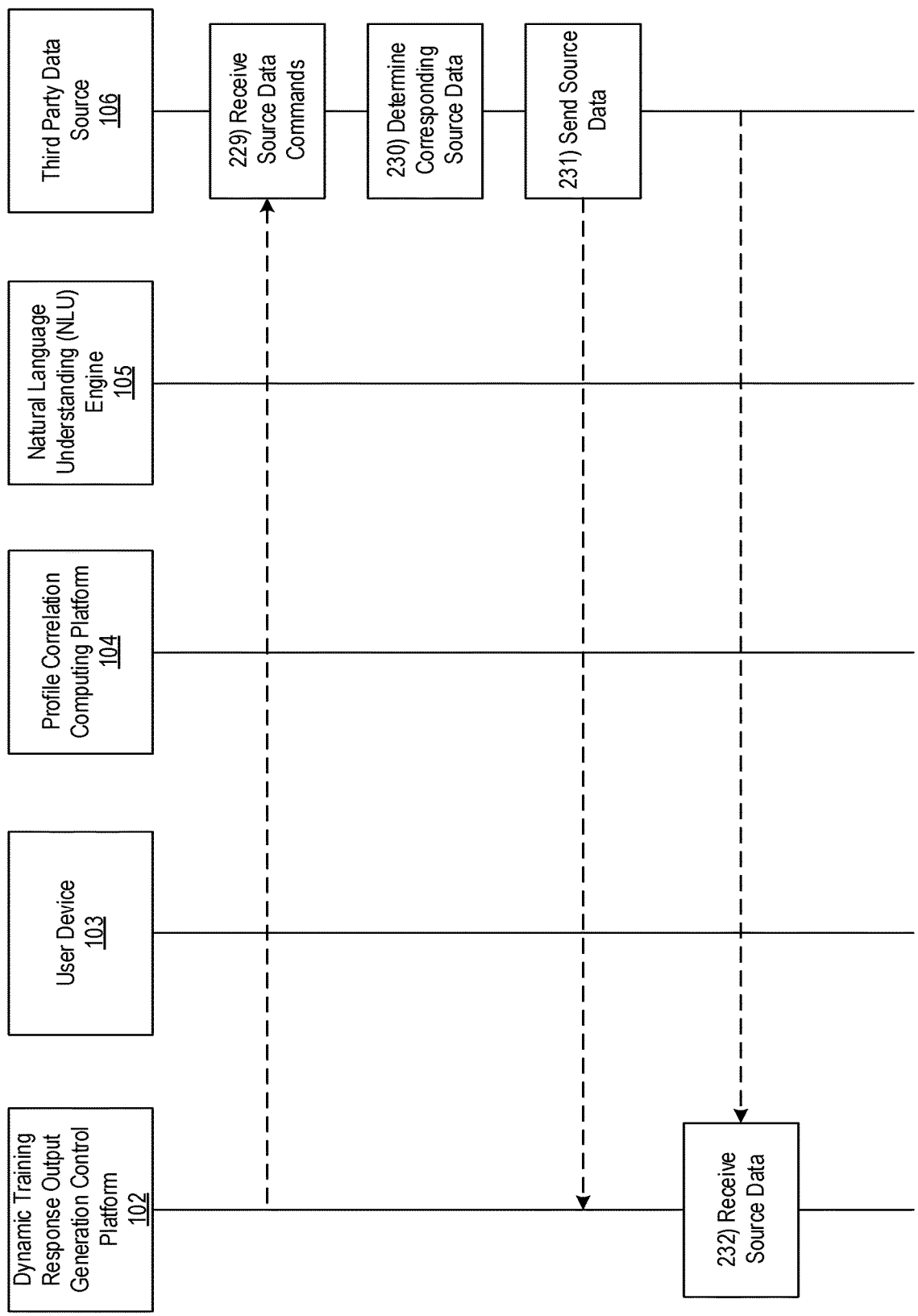

Referring to FIG. 2H, at step 229, the third party data source 106 may receive the one or more commands directing the third party data source 106 to provide third party source data corresponding to the natural language result output. For example, the third party data source 106 may receive, while the fourth wireless data connection is established and from the dynamic training response output generation control platform 102, the one or more commands directing the third party data source 106 to provide third party source data.

At step 230, the third party data source 106 may determine source data that corresponds to the natural language result output. For example, the natural language result output may indicate that the user drives a particular make and model of a vehicle. The third party data source 106 may be a database containing safety features corresponding to a plurality of vehicles. The third party data source 106 may determine safety features corresponding to the particular make and model of the vehicle driven by the user. The source data may be specific to a location corresponding to the user device such as local regulations, policy information and the like. In some examples, the third party data source 106 may correspond to one or more social media platform databases. In some examples, the third party data source 106 may be a vehicle appraisal database that contains values of different vehicle makes and models. In some examples, the third party data source 106 may be a database of financial records that contains an average or median net worth of users in a particular zip code.

At step 231, the third party data source 106 may send the source data determined at step 230 to the dynamic training response output generation control platform 102. For example, the third party data source 106 may send the source data, while the fourth wireless data connection is established and to the dynamic training response output generation control platform 102, the source data.

At step 232, the dynamic training response output generation control platform 102 may receive the source data sent by the third party data source 106 at step 231. For example, the dynamic training response output generation control platform 102 may receive, while the fourth wireless data connection is established, via the communication interface 113, and from the third party data source 106, the source data.

Although a single third party data source is described above with regard to steps 227-232, it should be understood that any number of third party data sources may provide the dynamic training response output generation control platform with source data.

With reference to FIG. 2I, referring to step 233, the dynamic training response output generation control platform 102 may generate a dynamic training response output. For example, based on the natural language result output and the source data, the dynamic training response output generation control platform 102 may generate the dynamic training response output. In generating the dynamic training response output, the dynamic training response output generation control platform 102 may generate, for example, a user interface including a response to the training request input. For example, the dynamic training response output generation control platform 102 may generate a user interface containing information corresponding to auto insurance, homeowners insurance, flood insurance, vehicle insurance, and the like. In some examples, the dynamic training response output generation control platform 102 may determine that a granularity of the dynamic training response output should be adjusted. For example, using machine learning algorithms and machine learning datasets the dynamic training response output generation control platform 102 may determine whether the dynamic training response output should include a more comprehensive or thorough explanation than a previous dynamic training response output. In some examples, the dynamic training response output generation control platform 102 may determine that the granularity should be increased based on a determination that an amount of training request inputs corresponding to a particular topic exceeds a predetermined granularity threshold. For example, if a user has asked five questions in a row pertaining to auto insurance, a more comprehensive explanation of auto insurance may be provided using the dynamic training response output. In other examples, the dynamic training response output generation control platform 102 may determine that the granularity should be decreased. For example, the user may be asking short pointed questions related to various different topics, and rather than providing detailed explanations related to those questions, the dynamic training response output generation control platform may provide a less comprehensive explanation using the dynamic training response output. In these examples, the dynamic training response output generation control platform may determine that the granularity threshold is not exceeded.

In some examples, the user may already be a known customer. In these examples, the dynamic training response output generation control platform 102 may leverage stored data related to the user and his or her previous interactions to determine the dynamic training response output. For example, the dynamic training response output generation control platform 102 may determine vehicles that correspond to the user.

In some examples, the dynamic training response output may prompt the user for additional information, such an address, user preferences, and the like. The dynamic training response output may also prompt the user for a vehicle selection. For example, if the user is interested in auto information, the dynamic training response output may prompt the user to select which vehicle they are interested in learning about.

In some examples, the dynamic training response output may include a value corresponding to a selected vehicle, and may prompt the user for how much he or she could spend out of pocket on a repair. In some examples, the dynamic training response output may include required, common, and proposed deductibles. The dynamic training response output generation control platform may generate the proposed deductibles using, for example, one or more machine learning algorithms and one or more machine learning datasets. The deductibles may be unique to a particular state. The deductibles may correspond to collision coverage. In some examples, the dynamic training response output may include limits for bodily injury, property damage, medical payments coverage, personal injury protection.

In some examples, the dynamic training response output may prompt a user for his or her net worth, and may indicate a user may need more protection the higher their net worth is. The dynamic training response output may also cause display of a mean net worth for a zip code corresponding to the user.

In some examples, the dynamic training response output may prompt the user for whether or not they have full health insurance coverage, and may show a percentage of uninsured users in a state, zip code, or country corresponding to the user. In some examples, the dynamic training response output may prompt the user for how much help they want paying for damage caused by drivers without insurance. Based on a user response, a subsequent dynamic training response may be generated showing a coverage recommendation. In some examples, the dynamic training response output may prompt the user for whether they would like coverage for a rental car. If the user would like coverage for a rental car, a dynamic training response output may be generated indicating coverage recommendations. In some examples, the dynamic training response output may prompt the user for whether they would like coverage that includes towing fees. If so, a dynamic training response output may be generated recommending coverage that includes towing fees. In addition or alternatively, the dynamic training response output may prompt a user for whether they want insurance to pay for a new vehicle if theirs is stolen, and may provide a recommendation based on the user's response.

In some examples, the dynamic training response output may prompt the user for whether they use their car for a ride share service, and if so, a dynamic training response output may be generated with a recommendation.

In some examples, the dynamic training response output generation control platform 102 may conduct a similar process for renters insurance. For example, the dynamic training response output generation control platform 102 may generate dynamic training response outputs prompting the user for a value of their property, whether they have expensive items they would like to protect, a value of the expensive items, whether they would like to have coverage for an injury occurring at the rented property, whether they want hotel stays to be covered, whether they want flood damage to be covered, whether they want earthquake damage to be covered, and the like. Based on user responses, the dynamic training response output generation control platform 102 may provide information and recommendations using a subsequent dynamic training response output.

In these examples, the dynamic training response output generation control platform 102 may use one or more machine learning algorithms and one or more machine learning algorithm datasets as well as third party data such as local hotel prices, local flood risk, local earthquake risk, and the like. The dynamic training response output generation control platform 102 may cause display of these values on the dynamic training response outputs.

In some examples, the dynamic training response output may be a textual or audio output response to a user question. For example, if the user asked "I am a ride share driver, am I covered?", the dynamic training response output may indicate "Your personal car insurance may not cover you completely," and may provide further information regarding additional coverage. In some examples, the training request input may be a textual or audio input indicating "What if I hit a deer?" The dynamic training response output corresponding to this training request input may be "Typically damage to your vehicle is covered if you have comprehensive coverage" and may provide additional information about comprehensive coverage. In some examples, the user may ask for more information regarding comprehensive coverage, and the dynamic training response output may provide yet additional information regarding comprehensive coverage (e.g. "comprehensive can help cover costs when your vehicle is hit or damaged by something," and the like).

At step 234, the dynamic training response output generation control platform 102 may generate one or more commands directing the user device 103 to cause display of the dynamic training response output.

At step 235, the dynamic training response output generation control platform 102 may send the dynamic training response output and the one or more commands directing the user device 103 to cause display of the dynamic training response output generated at step 234. For example, the dynamic training response output generation control platform 102 may send, while the first wireless data connection is established and via the communication interface 113, the dynamic training response output and the one or more commands directing the user device 103 to cause display of the dynamic training response output.

At step 236, the user device 103 may receive the dynamic training response output generation control platform 102 and the one or more commands directing the user device 103 to cause display of the dynamic training response output. For example, the user device 103 may receive, while the first wireless data connection is established, the dynamic training response output generation control platform 102 and the one or more commands directing the user device 103 to cause display of the dynamic training response output.

Referring to FIG. 2J, at step 237, the user device may cause display of the dynamic training response output.

At step 238, the dynamic training response output generation control platform 102 may determine whether a final training response output has been sent. For example, the natural language result output may indicate that the user has reached an education satisfaction threshold and will not request any additional training response outputs. If the dynamic training response output generation control platform 102 determines that the final training response output has been sent, the dynamic training response output generation control platform 102 may proceed to step 239. In some examples, if the final training response output has been sent, the dynamic training response output generation control platform 102 may generate a recommendation summary containing a summary of the information provided to the user through the training response outputs. If the dynamic training response output generation control platform 102 determines that a final training response output has not been sent, the dynamic training response output generation control platform 102 may return to step 213 to wait for a subsequent training request input.

At step 239, the dynamic training response output generation control platform 102 may determine whether an agent is requested. In some examples, the dynamic training response output generation control platform 102 may send a prompt to the user device directing the user device to generate a user interface that asks the user whether they would like to speak with an agent. If the dynamic training response output generation control platform 102 determines that an agent is requested, the dynamic training response output generation control platform 102 may proceed to step 240. If the dynamic training response output generation control platform 102 determines that an agent is not requested, the process may end.

At step 240, the dynamic training response output generation control platform 102 may generate one or more commands directing the profile correlation computing platform 104 to identify an agent corresponding to the user.

Figure 2K:
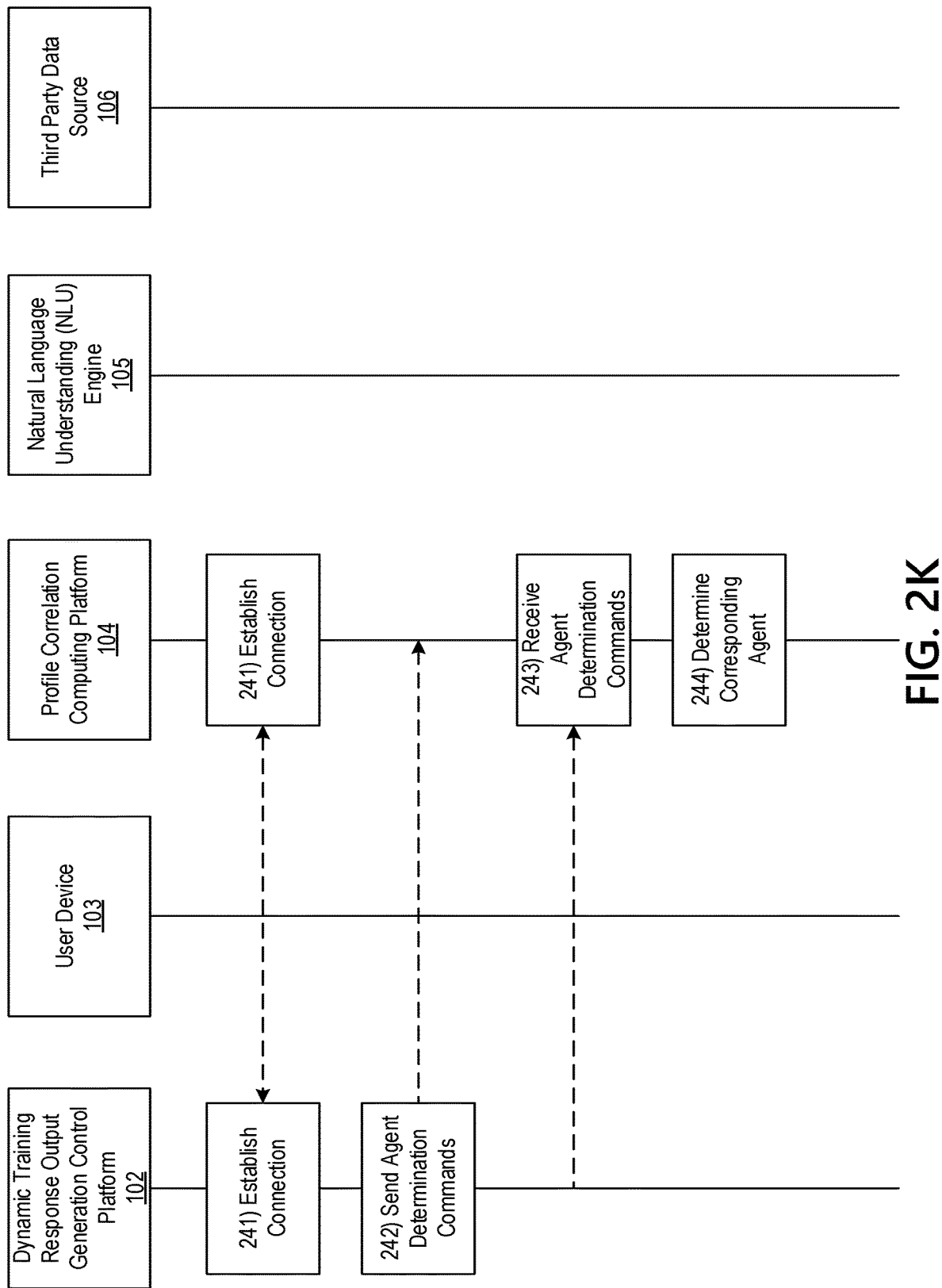

Referring to FIG. 2K, at step 241, the dynamic training response output generation control platform 102 may establish a connection with the profile correlation computing platform 104. For example, the dynamic training response output generation control platform 102 may establish a fifth wireless data connection with the profile correlation computing platform 104 to link the dynamic training response output generation control platform 102 to the profile correlation computing platform 104.

At step 242, the dynamic training response output generation control platform 102 may send the one or more commands directing the profile correlation computing platform 104 to identify an agent corresponding to the user to the profile correlation computing platform 104. In some examples, the dynamic training response output generation control platform 102 may send, while the fifth wireless data connection is established, via the communication interface, and to the profile correlation computing platform 104, the one or more commands directing the profile correlation computing platform 104 to identify an agent corresponding to the user.

At step 243 the profile correlation computing platform 104 may receive, from the dynamic training response output generation control platform 102, the one or more commands directing the profile correlation computing platform 104 to identify an agent corresponding to the user. For example, the profile correlation computing platform 104 may receive, from the dynamic training response output generation control platform 102 and while the fifth wireless data connection is established, the one or more commands directing the profile correlation computing platform 104 to identify an agent corresponding to the user.

At step 244, the profile correlation computing platform 104 may determine an agent corresponding to the user. For example, using one or more machine learning algorithms and one or more machine learning datasets, the profile correlation computing platform 104 may determine one or more agents corresponding to the user. For example, the agents may correspond to topics that the user asked about using the training request inputs. In some examples, the profile correlation computing platform 104 may determine an agent matching output corresponding to a numeric value representative of the strength of a match between an agent and the user. In these examples, the profile correlation computing platform 104 may determine an agent by determining which agent corresponds to the highest agent matching output. In some examples, the agent matching process may include consideration of location data. For example, an agent may be determined that works within a predetermined distance from the user's residence.

Referring to FIG. 2L, at step 245, after determining the agent at step 244, the profile correlation computing platform 104 may send an indication of the agent to the dynamic training response output generation control platform 102. For example, the profile correlation computing platform 104 may send, while the fifth wireless data connection is established and to the dynamic training response output generation control platform 102, the indication of the agent.

At step 246, the dynamic training response output generation control platform 102 may receive the indication of the agent sent at step 245. For example, the dynamic training response output generation control platform 102 may receive, while the fifth wireless data connection is established and from the profile correlation computing platform 104, the indication of the agent.

At step 247, the dynamic training response output generation control platform 102 may generate one or more commands directing the user device 103 to cause display of the indication of the agent.

At step 248, the dynamic training response output generation control platform 102 may send the agent indication and the one or more commands directing the user device 103 to cause display of the indication of the agent to the user device 103. For example, the dynamic training response output generation control platform 102 may send, while the first wireless data connection is established, via the communication interface 113, and to the user device 103, the indication of the agent and the one or more commands directing the user device 103 to cause display of the indication of the agent.

Figure 2M:
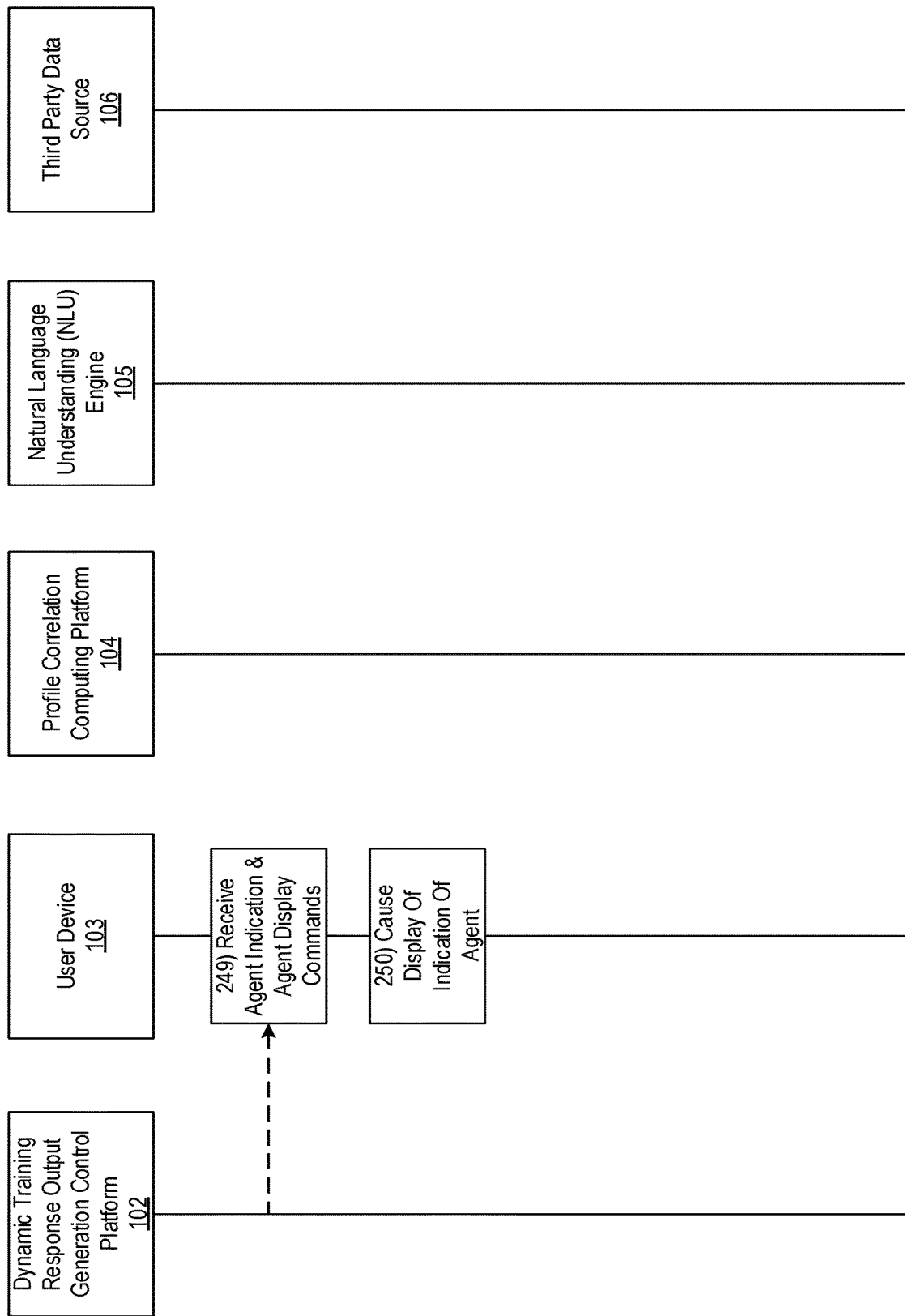

Referring to FIG. 2M, at step 249, the user device 103 may receive the indication of the agent and the one or more commands directing the user device 103 to cause display of the indication of the agent. For example, the user device 103 may receive, while the first wireless data connection is established, from the dynamic training response output generation control platform 102, the indication of the agent and the one or more commands directing the user device 103 to cause display of the indication of the agent.

At step 250, in response to receiving the one or more commands to cause display of the indication of the agent at step 249, the user device 103 may cause display of the indication of the agent. For example, the user device 103 may cause display of a name and contact information corresponding to the agent.

Subsequently, the example event sequence may end, and dynamic training response output generation control platform 102 may continue to generate dynamic training response outputs in a similar manner as discussed above (e.g., by receiving natural language result outputs from the NLU engine 105, receiving source data from third party data source 106, and determining dynamic training response outputs based on the natural language result outputs and the source data). By operating in this way, dynamic training response output generation control platform 102 may improve the efficiency of communication between users and organizations regarding the insurance education and may improve the quality of responses generated by the dynamic training response output generation control platform 102 in response to user input.

It should be understood that the method described by FIGS. 2A-2M is merely illustrative and may be used to obtain information corresponding to any insurance product such as RV, motorcycle, life, boat, home, auto, and the like. In addition, it should be understood that this method may be used to provide information related to any type of item and is not limited to insurance products.

Figure 5:
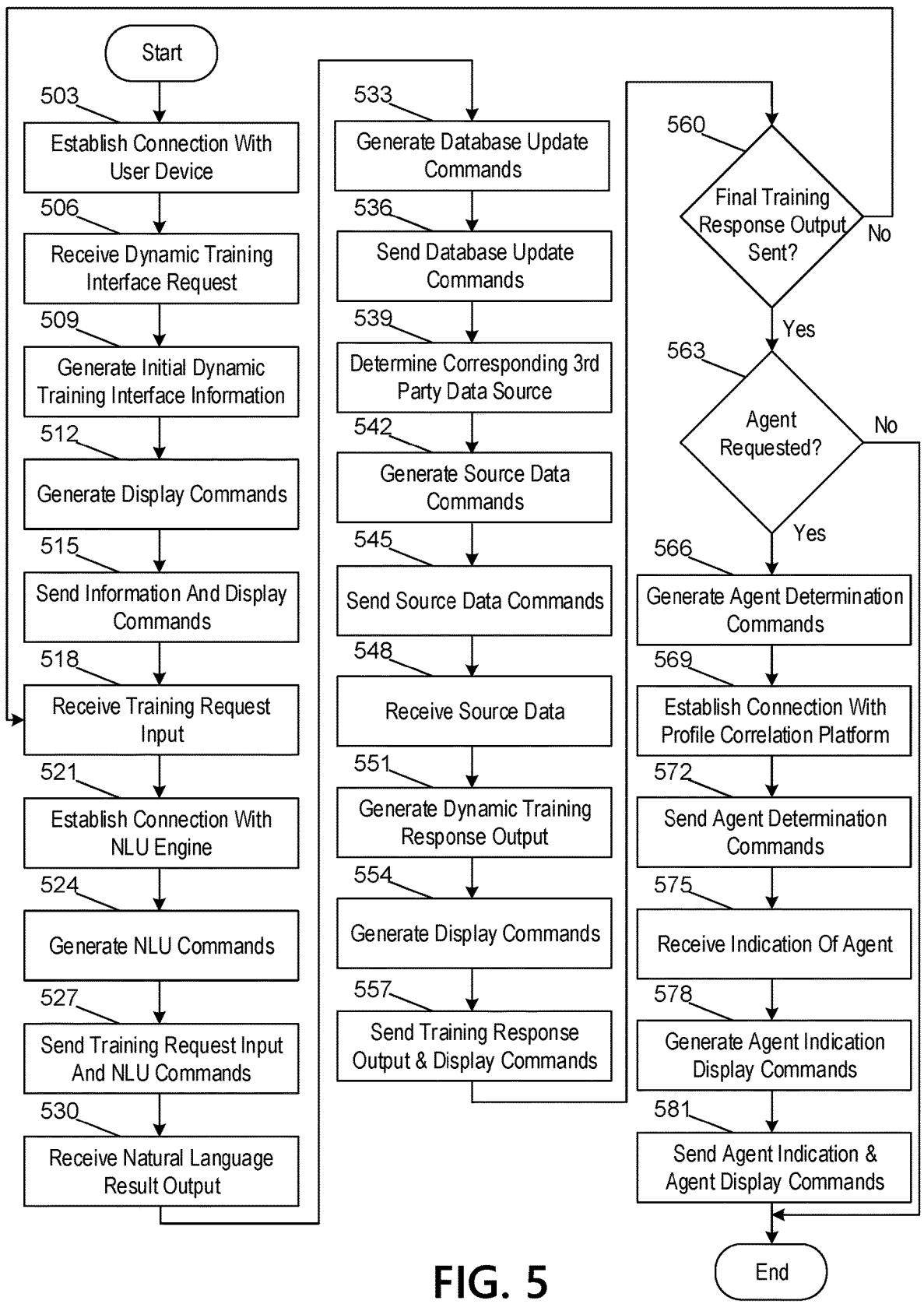
FIG. 5 depicts an illustrative method for deploying a dynamic training response output generation control platform that utilizes improved dynamic training response output generation techniques in accordance with one or more example arrangements discussed herein.

FIG. 5 depicts an illustrative method for deploying a dynamic training response output generation control platform that utilizes improved dynamic training response output generation techniques in accordance with one or more example embodiments. Referring to FIG. 5, at step 503, the dynamic training response output generation control platform may establish a connection with a user device. At step 506, the dynamic training response output generation control platform may receive a dynamic training interface request from the user device. At step 509, the dynamic training response output generation control platform may generate initial dynamic training interface information. At step 512, the dynamic training response output generation control platform may generate one or more commands directing the user device to generate an initial dynamic training interface using the initial dynamic training interface information. At step 515, the dynamic training response output generation control platform may send the initial dynamic training interface information generated at step 509 and the one or more commands directing the user device to generate an initial dynamic training interface generated at step 512 to the user device. At step 518, the dynamic training response output generation control platform may receive a training request input from the mobile device. At step 521, the dynamic training response output generation control platform may establish a connection with an NLU engine. At step 524, the dynamic training response output generation control platform may generate one or more commands directing the NLU engine to perform natural language understanding and processing on the training request input to determine a natural language result output. At step 527, the dynamic training response output generation control platform may send the training request input received at step 518 and the one or more commands directing the NLU engine to perform natural language understanding and processing generated at step 524 to the NLU engine. At step 530, the dynamic training response output generation control platform may receive a natural language result output from the NLU engine.

At step 533, the dynamic training response output generation control platform may generate one or more commands directing a profile correlation computing platform to update based on the natural language result output. At step 536, the dynamic training response output generation control platform may send the one or more commands directing the profile correlation computing platform to update based on the natural language result update generated at step 533. At step 539, the dynamic training response output generation control platform may determine one or more third party data sources corresponding to the natural language result output. At step 542, the dynamic training response output generation control platform may generate one or more commands directing the one or more third party data sources corresponding to the natural language result output to send source data corresponding to the natural language result output. At step 545, the dynamic training response output generation control platform may send the one or more commands directing the one or more third party sources corresponding to the natural language result output to send source data corresponding to the natural language output to the one or more third party data sources. At step 548, the dynamic training response output generation control platform may receive the source data corresponding to the natural language output from the one or more third party data sources. At step 551, the dynamic training response output generation control platform may generate a dynamic training response output based on the natural language result output and the source data. At step 554, the dynamic training response output generation control platform may generate one or more commands directing the user device to cause display of the dynamic training response output. At step 557, the dynamic training response output generation control platform may send the training response output generated at step 551 and the one or more commands directing the user device to cause display of the dynamic training response output generated at step 554 to the user device.

At step 560, the dynamic training response output generation control platform may determine whether a final training response output has been sent. If the dynamic training response output generation control platform determines that the final training response output has not been sent, the dynamic training response output generation control platform may return to step 518 to receive an additional training request input. If the dynamic training response output generation control platform determines that the final training response output has been sent, the dynamic training response output generation control platform may proceed to step 563.

At step 563, the dynamic training response output generation control platform may determine whether an agent has been requested. If the dynamic training response output generation control platform determines that an agent has been requested, the dynamic training response output generation control platform may proceed to step 566. If an agent has not been requested, the method may end.

At step 566, the dynamic training response output generation control platform may generate one or more commands directing the profile correlation computing platform to identify an agent corresponding to a user of the user device. At step 569, the dynamic training response output generation control platform may establish a connection with the profile correlation computing platform. At step 572, the dynamic training response output generation control platform may send the one or more commands directing the profile correlation computing platform to identify the agent corresponding to the user of the user device to the profile correlation computing platform. At step 575, the dynamic training response output generation control platform may receive an indication of the agent from the profile correlation computing platform. At step 578, the dynamic training response output generation control platform may generate one or more commands directing the user device to cause display of the indication of the agent. At step 581, the dynamic training response output generation control platform may send the indication of the agent and the one or more commands directing the user device to cause display of the indication of the agent to the user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   a dynamic training response output generation control platform configured to send one or more commands directing a user device to generate an initial dynamic training interface using initial dynamic training interface information, the dynamic training response output generation control platform receiving a training request input captured using the initial dynamic training interface; and
   a natural language understanding (NLU) engine configured to perform natural language understanding and processing on the training request input to determine a natural language result output, a dynamic training response output being generated based on the natural language result output and sent to the user device for display,
   wherein an agent is identified based on the training request input,
   wherein the agent is determined to correspond with a user corresponding to the user device based on at least one of a topic, an agent matching output representing a strength of a match between the user and the agent, or a location, and
   wherein the location corresponds to a predetermined distance from a residence associated with the user when the agent is determined.

2. A method comprising:
   sending one or more commands directing a user device to generate an initial dynamic training interface using initial dynamic training interface information;
   receiving training request input captured using the initial dynamic training interface;
   obtaining a natural language result output corresponding to the training request input;
   generating a dynamic training response output based on the natural language result output;
   sending one or more commands directing the user device to cause display of the dynamic training response output; and
   determining that an agent has been requested; and
   identifying the agent based on at least one of a topic, an agent matching output representing a strength of a match between a user corresponding to the user device and the agent, or a location, and
   wherein the location corresponds to a predetermined distance from a residence associated with the user when the agent is identified.

3. The method of claim 2, further comprising:
   determining, based on previously received training request inputs, that granularity of the dynamic training response output should be increased; and
   determining a more specific dynamic training response output in comparison to previously sent dynamic training response outputs.

4. One or more non-transitory computer-readable media storing instructions that, when executed by a computing platform comprising at least one processor cause the computing platform to:
   send one or more commands directing a user device to generate an initial dynamic training interface using initial dynamic training interface information;
   receive a training request input from the user device; obtaining a natural language result output generated based on the training request input;
   generate a dynamic training response output based on the natural language result output; send one or more commands directing the user device to cause display of the dynamic training response output;
   identify an agent based on the training request input and in response to a request for the agent; and
   select the agent based on at least one of a topic, an agent matching output representing a strength of a match between a user corresponding to the user device and the agent, or a location, and
   wherein the location corresponds to a predetermined distance from a residence associated with the user when the agent is selected.

5. The system of claim 1, wherein the one or more commands are sent to the user device in response to a request from the user device.

6. The system of claim 1, wherein the initial dynamic training interface prompts the user to select either a guided dynamic training experience or an unguided dynamic training experience.

7. The system of claim 1, wherein the dynamic training response output is further generated based on source data corresponding to the natural language result output.

8. The system of claim 7, wherein the source data is obtained from one or more third party data sources.

9. The system of claim 1, wherein a profile correlation platform is updated based on the natural language result output.

10. The method of claim 2, further comprising:
   identifying the agent using a profile correlation platform updated using the natural language result output.

11. The one or more non-transitory computer-readable media of claim 4, wherein the initial dynamic training interface prompts the user to select either a guided dynamic training experience or an unguided dynamic training experience.

12. The one or more non-transitory computer-readable media of claim 4, wherein the dynamic training response output is further generated based on source data corresponding to the natural language result output.

* * * * *